United States Patent [19]

Goldwasser

[11] Patent Number: 5,292,255

[45] Date of Patent: Mar. 8, 1994

[54] BEADED PICTURE KIT AND METHOD

[76] Inventor: Solomon P. Goldwasser, P.O. Box 129, Rte. 52, Loch Sheldrake, New York, N.Y. 12759

[21] Appl. No.: 982,984

[22] Filed: Nov. 30, 1992

[51] Int. Cl.⁵ .............................................. G09B 11/00
[52] U.S. Cl. ........................................ 434/84; 434/96; 434/81
[58] Field of Search ................... 434/81, 83, 84, 96, 434/98, 95

[56] References Cited

U.S. PATENT DOCUMENTS

| | | | |
|---|---|---|---|
| 2,937,931 | 5/1960 | Nagent | 434/84 X |
| 3,176,836 | 4/1965 | Gunn | 434/84 X |
| 3,680,225 | 8/1972 | Ishida | 434/84 |
| 3,846,214 | 11/1974 | Rosenzweig et al. | 434/96 X |
| 3,976,807 | 8/1976 | Sweeney et al. | 434/81 X |
| 4,012,936 | 5/1977 | Stolzer | 434/96 |
| 4,073,070 | 2/1978 | Boston | 434/84 |
| 4,355,722 | 10/1982 | Lemmeyer | 434/84 X |
| 4,445,950 | 5/1984 | Browning | 434/83 X |

Primary Examiner—Gene Mancene
Assistant Examiner—L. Thomas
Attorney, Agent, or Firm—Sandra M. Kotin

[57] ABSTRACT

A kit and method for making beaded pictures whereby a base card is impressed and printed with the outline of a picture. An adhesive is applied to the base card along the imprinted outline and strings of beads are applied thereto to outline sections of the picture. Adhesive is thereafter spread over the bead outlined areas and beads are placed thereon until the entire picture surface is beaded. The completed picture is coated with a film of transparent glue to preserve the beading. The size of bead and type of bead can be varied such that kits suitable for use by all ages and levels of skill are possible.

14 Claims, 3 Drawing Sheets

BEADED PICTURE KIT AND METHOD

FIELD OF THE INVENTION

The instant invention relates to a method and craft kit for making artworks by outlining and filling in designated areas with strings of beads of different colors to produce a picture suitable for framing.

BACKGROUND OF THE INVENTION

The paint-by-number method of making pictures has been available for many years and pictures of varying complexity have been sold for use by different age groups. These are on the market as kits which include the picture printed on a cardboard back with numbers denoting different colors in the various outlined areas, and the paints corresponding to those numbers. Needlepoint projects are also sold as fabric imprinted with the design coded as to color. Ellwein added three dimensional appliques to the needlework to form parts of the picture such as a face, flower or balloon (U.S. Pat. No. 4,495,230).

Lovejoy (U.S. Pat. No. 2,148,632) teaches a method of using flexible strands on a board to outline a picture. A craft section in Popular Mechanics shows the use of a necklace chain to form the profile of a face. The shape can be changed to make any number of humerous profiles (October 1961, vol. 116, no. 4, page 206). Urbach (U.S. Pat. No. 2,784,513) uses adhesive impregnated fiber strands of different colors affixed to a background or support to form decorative designs or pictures.

In U.S. Pat. No. 2,876,575, Leika teaches a method of making a picture with colored powders or granules. The picture is formed from a base sheet coated with a pressure sensitive adhesive over which is placed a thin cover sheet which is die cut in sections. The sections are numbered corresponding to specific colors. As each section of the cover sheet is removed, the adhesive is exposed and dusted with a powder or granules of one of the specified colors. When all of the sections of the cover sheet have been removed and color applied, a picture results, Lemmeyer (U.S. Pat. No. 4,355,722) shows a similar board with numbered cover sections which are removed to expose adhesive to which colored yarns are applied to form a picture. Hamanaka used yarn with a pressure sensitive adhesive to make designs on flat and three dimensional surfaces (U.S. Pat. No. 4,083,740).

A graphic arts toy utilizes string or yarn which is retained by flexible fingers attached to a board. Any color can be used and the designs are retained until the user chooses to remove them and start again. (Fogarty et al. in U.S. Pat. No. 4,540,375).

A recent U.S. Patent (U.S. Pat. No. 5,106,305; Grant) discloses a kit which comprises a base sheet outlined with numbered areas, adhesively backed colored foil segments and a transparent overlay carrying a design outlined in black. When the numbered areas are filled with the appropriate foil segments and the cover sheet is set in place, a picture results in which the colors are highlighted by the black outline.

An old Russian craft involved sewing beads onto a fabric to produce pictures which were framed and hung as works of art. The technique was time consuming and tedious. The beads were applied in strings, but there were stitches between each two beads to affix the strings of beads to the fabric. The instant invention attempts to achieve the appearance of the old craft, but provides a much easier method of attaining that end. A base card is imprinted with the design and has numbered sections to designate the color to be used. The beads are applied in strings and affixed along the imprinted outline with an adhesive. The sections are then filled in with additional beads. The final picture has the appearance of the stitched beads. The method can be utilized by children as well as adults, and can be accomplished with beads of different sizes, though the size of beads used in any one design is uniform.

BRIEF SUMMARY OF THE INVENTION

The present invention provides a method and kit for making beaded pictures similar to those produced by an old Russian craft. The pictures are much easier to accomplish and are suitable for framing.

It is an object of the present invention to provide a craft whereby young and old alike can create a decorative finished product, without the necessity of extensive training or particular artistic skills.

It is another object of the present invention to have the beads applied in strings so that handling them will be easy and so that loose beads will not be a problem.

A further object of the present invention is to create a craft project that will be fun, entertaining and require some dexterity so as to be a learning experience as well as to produce a useful and decorative product.

Another object of the present invention is to have a final product that strongly resembles those made by the old Russian method, but that can be attained much more easily, with less eye strain, and requires considerably less time to complete.

The kit of the present invention contains a background board or base card which is imprinted with the design to be followed. The imprinting produces a depression or groove to facilitate the positioning of the outlining strings of beads. Once the outlines are in place, it is a simple matter to fill in the sections and complete the picture. Where sections are small, such as facial features, individual unstrung beads may be applied.

In one embodiment of the invention, the background board or base card is covered with a fabric overlay. This provides a softer background and is used with smaller beads such as the very small glass beads used in fine fabric beading. The design is imprinted over the fabric and the beads are thereafter applied in the same fashion. The finished product is very similar in appearance to those made by the Russian craft.

Other features and advantages of the invention will be seen from the following description and drawings.

DETAILED DESCRIPTION OF THE INVENTION

Figure 1:
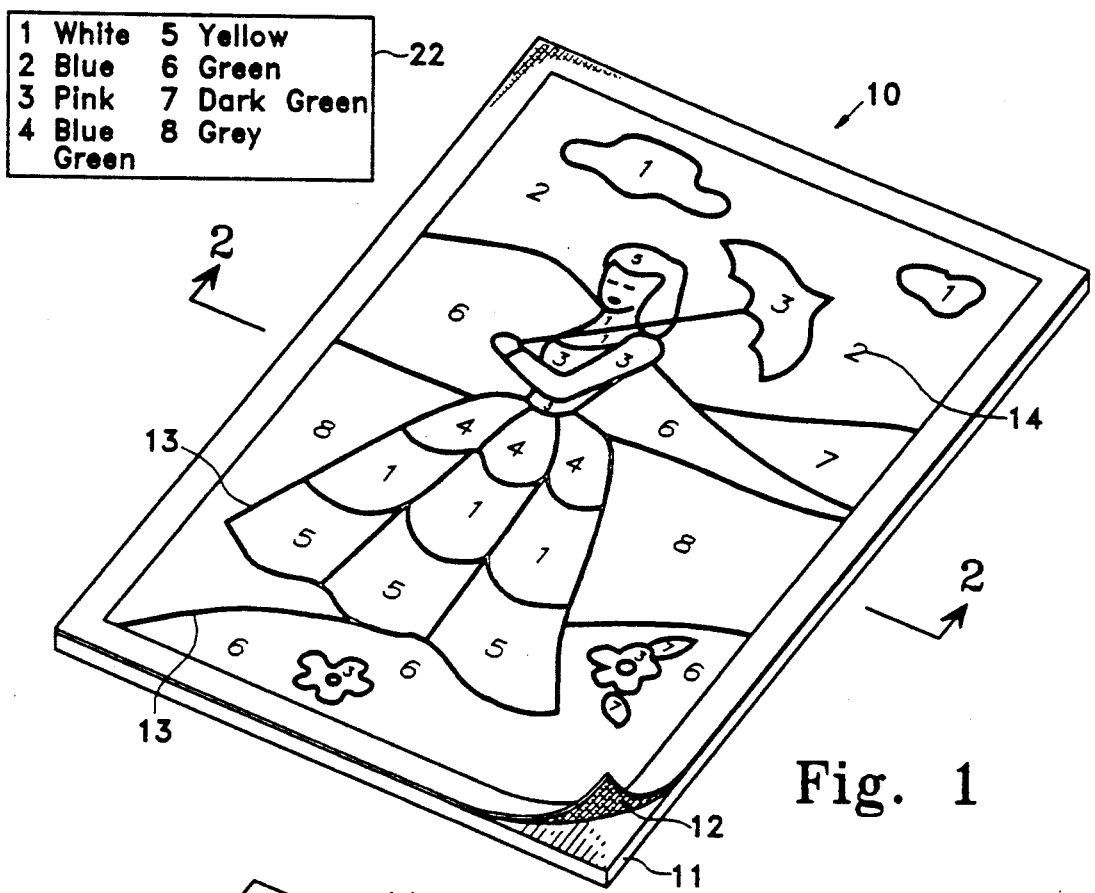
FIG. 1 is a perspective view of the base card with printed design on the fabric overlay, for use in present invention. One corner of the fabric overlay being turned up.
Figure 3:
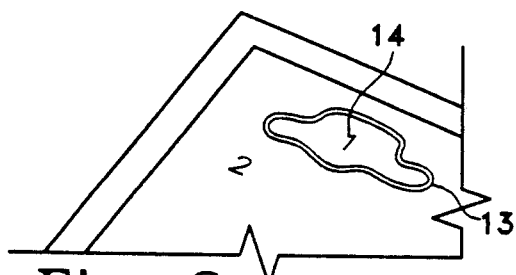
FIG. 3 is a cutaway view of a corner of the base card showing a portion of the design.

The beaded picture of kit of the present invention is comprised of a base card 11 which can be made of stiff cardboard or other rigid material such as wood or plastic, the beads, a color key chart and an adhesive. A brush and transparent craft glue may also be provided in the kit. The base card 11 may be covered with a fabric overlay 12 for a finer work product. An example of a fabric covered base card 10 is seen in FIG. 1.

Figure 2:
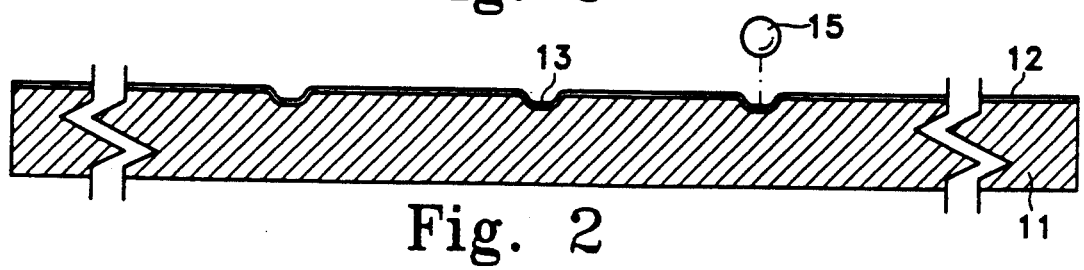
FIG. 2 is a cross sectional view along line 2—2 of FIG. 1 showing the imprint for the outline of the design and the string of beads to be affixed thereon.

The design to be followed is stamped into the surface of the base card so as to leave an impression 13 of the outline of the design. See FIG. 2. The design is also printed on the base card on top of the impression 13 for better visualization of the design. Numbers 14 are also printed on the base card, inside the outlined areas to indicate the colors to be used. The color or number key 22 provided with the kit suggests to the user the color to be placed in each of the outlined areas. The user may follow the key or make color changes as preference dictates, since many color variations will be possible for a given design or picture.

The stamping and printing may be done in one operation or in two steps in the manufacture of the base card. When a fabric overlay is to be used, the fabric is bonded to the base card with an adhesive prior to the stamping and printing steps.

Strings of beads 15 are supplied with one form of the kit. Each string would contain beads of only one color. Another and less costly form of the kit may have loose beads which the user strings before application. A glue pen 16 for applying adhesive may also be included or may be purchased separately.

Figure 4:
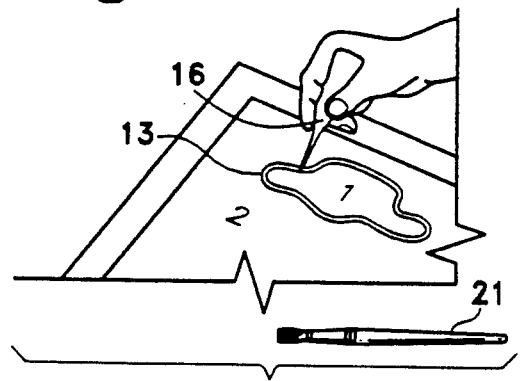
FIG. 4 is a cutaway view of the same corner as in FIG. 3 and showing the application of adhesive to the imprinted outline.
Figure 5:
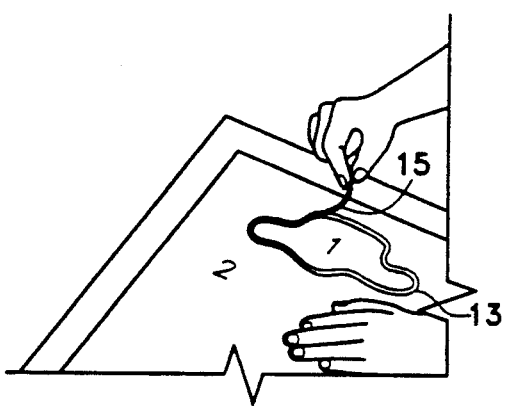
FIG. 5 is a cutaway view of the same corner as in FIG. 4 showing the application of a string of beads to the imprinted outline.

Using a glue pen 16 (FIG. 4), or other glue applicator, the user applies adhesive along a section of the printed outline and into the impression 13 and thereafter places a string of beads 15 on the adhesive (FIG. 5). The impression 13 makes it easy to guide the string of beads 15 into place and maintain it in place until the adhesive has dried.

Figure 6:
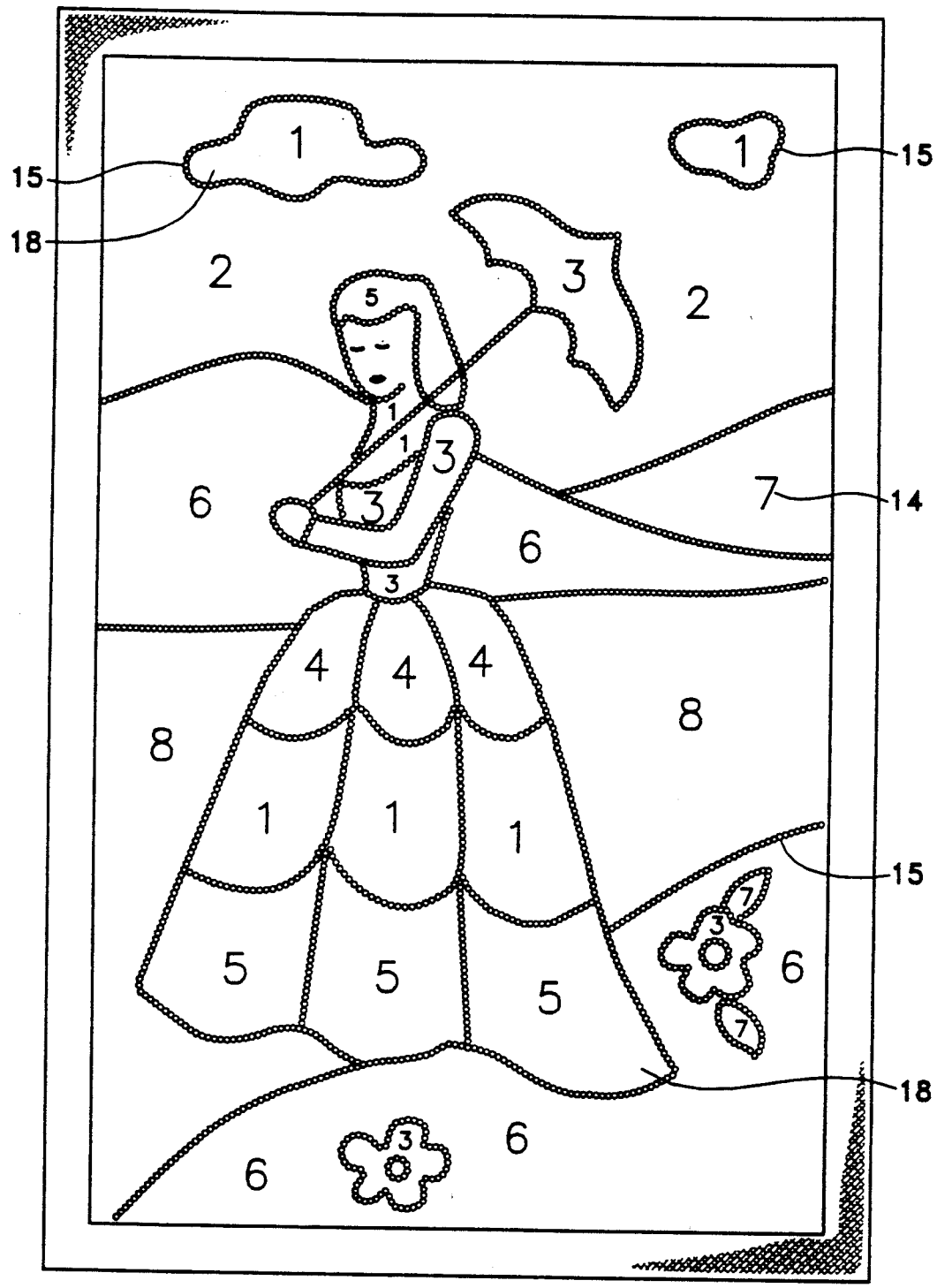
FIG. 6 is a plan view of the base card of the invention corresponding to that of FIG. 1 wherein all of the imprinted outlines have been filled in with strings of beads.
Figure 7:
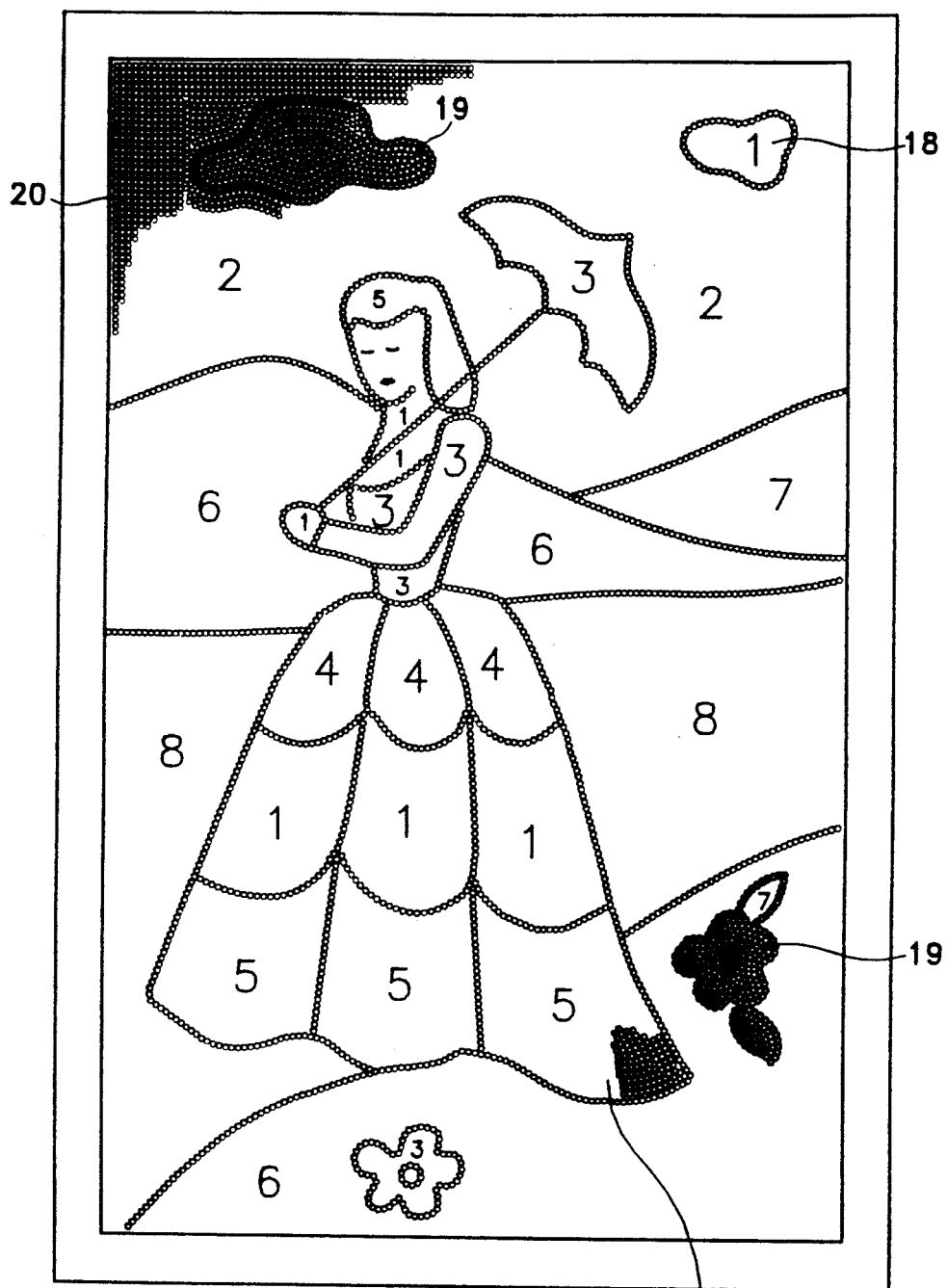
FIG. 7 is a plan view of the base card of FIG. 6 showing some of the previously outlined areas filled in with beads.
Figure 8:
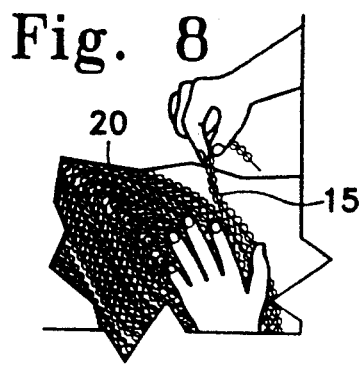
FIG. 8 is a cutaway view of an area of the base card showing the application of strings of beads to a previously outlined area.
Figure 9:
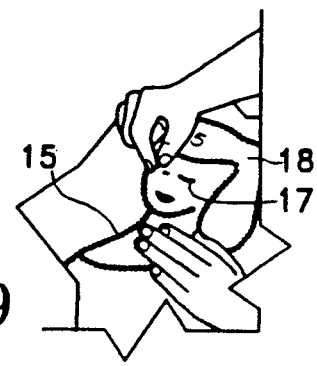
FIG. 9 is a cutaway view of an area of the base card showing the application of individual beads to a specific detail area of the design.

The user may thereafter fill in all of the outlines as seen in FIG. 6, or may work on one section of the picture at a time. Once a section is outlined, glue is spread, by using a brush 21 or other applicator, throughout the outlined section 18 and strings of beads 15 are applied in a circular (FIG. 8) or zig-zag pattern until the entire section is filled in (FIG.7). This process is repeated until the picture is completed. The illustration in FIG. 7 shows filled in area 19, but does not show all beaded areas filled in because the completed picture would be too dark for reproduction on the patent.

Where an area in the picture requires fine detail, such as facial features, the lines may also be impressed into the board. Single beads 17 are applied to those lines or detail sections individually (FIG. 9) to produce the desired detail.

The user may apply beads individually to any or all areas if he/she chooses. This will greatly increase the time necessary to complete the picture and will produce a more textured appearance as opposed to the smoother look when the beads are applied in strings. The user may choose to fill in specific areas by applying the beads individually to produce different texture effects.

When the picture is completed and all adhesive has set, a coating of transparent craft glue is applied by spraying or brushing over the entire beaded surface. This provides a firm surface cover and further fixes the beads in place.

This craft may be practiced by both adults and children. Kits for children would contain a plain cardboard base card and utilize large beads. Kits designed for use by adults may be prepared in several levels of refinement, the most intricate utilizing a base card with a fabric overlay and the very small glass beads used in fine fabric bead work. Beads used in the instant invention may be made of wood, glass, plastic, metal or any other rigid material. They may be of any color or texture, and the choice of bead will determine the appearance of the finished product.

The craft kit may be sold complete with base card, color key, strings of beads, glue pen and brush, or the base card and components may be sold separately so that the user can select his or her own compliment of colors.

The subject of the picture can be quite varied and can range from a simple figure to an abstract design, a still life, or a pastoral scene.

While one embodiment of the present invention has been illustrated and described in detail, it is to be understood that this invention is not limited thereto and may be otherwise practiced within the scope of the following claims.

I claim:

1. A kit for making beaded pictures comprising:
   a base card with a picture outline printed thereon and also impressed into the surface of said base card;
   numbers printed within each outlined area of the picture, each number representing the color of beads to be applied to said outlined area;
   a number key chart to indicate the color corresponding to each number;
   a supply of strings of beads of various colors, each string accommodating only beads of one color;
   a glue pen for use in applying adhesive to the surface of said base card to permanently affix the beads thereon;
   a brush for spreading the adhesive over surface areas of the base card;
   transparent craft glue for use in coating the finished picture to further affix the beads to the base card.

2. A kit for making beaded picture as in claim 1 wherein the base card has a fabric overly adhesively bonded to the surface thereof.

3. A kit for making beaded pictures as in claim 1 wherein the beads are made of wood.

4. A kit for making beaded pictures as in claim 1 wherein the beads are made of glass.

5. A kit for making beaded pictures as in claim 1 wherein the beads are made of plastic.

6. A kit for making beaded pictures as in claim 1 wherein the beads are made of metal.

7. A kit for making beaded pictures as in claim 1 wherein the beads are supplied loose for application individually or for stringing by the user.

8. A method for making beaded pictures comprising:

printing and impressing the outline of a picture on a base card;

applying an adhesive to a portion of the outline defining a specific portion of the picture;

placing a string of beads along the portion of the outline containing the adhesive;

permitting the adhesive to dry;

repeating the application of adhesive, placing of strings of beads and drying steps until all of the picture has been outlined with beads;

applying adhesive to an outlined area and spreading it with a brush or other applicator;

applying strings of beads to the adhesive covered area in an ordered pattern until said area has been completely filled in with beads;

repeating the application of adhesive and placing of beads until the entire picture has been completed by the filling in with beads;

waiting for all of the adhesive to dry;

brushing the beaded surface with transparent craft glue to further affix the beads to the base card and to provide a protective cover to the surface of the picture.

9. A method of making beaded pictures as in claim 8 including the additional steps of: first spreading an adhesive over the entire surface of the base card and applying a fabric overlay to the base card.

10. A method of making beaded pictures as in claim 8 wherein the beads are applied individually.

11. A beaded picture made by the method of claim 8.

12. A kit for making beaded pictures comprising:

a supply of beads of various colors;

a base card having an upper surface with a picture outline printed thereon and also impressed into the surface of said base card to provide a groove therein, said groove being a guide for the placement of beads used to outline said picture; and an adhesive to be applied as needed to affix the beads to the surface of said base card.

13. A beaded picture made from the kit of claim 1.

14. A beaded picture made from the kit of claim 12.

* * * * *